United States Patent
Russell et al.

(10) Patent No.: US 11,852,829 B2
(45) Date of Patent: Dec. 26, 2023

(54) TUNABLE CYLINDRICAL LENSES AND HEAD-MOUNTED DISPLAY INCLUDING THE SAME

(71) Applicant: Magic Leap, Inc., Plantation, FL (US)

(72) Inventors: Andrew Ian Russell, Plantation, FL (US); Joshua Naaman Haddock, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/007,244

(22) PCT Filed: Aug. 6, 2021

(86) PCT No.: PCT/US2021/045110
§ 371 (c)(1),
(2) Date: Jan. 27, 2023

(87) PCT Pub. No.: WO2022/032198
PCT Pub. Date: Feb. 10, 2022

(65) Prior Publication Data
US 2023/0266592 A1    Aug. 24, 2023

Related U.S. Application Data

(60) Provisional application No. 63/062,746, filed on Aug. 7, 2020.

(51) Int. Cl.
G02B 27/01    (2006.01)
G02B 27/00    (2006.01)
G02B 27/02    (2006.01)

(52) U.S. Cl.
CPC ..... *G02B 27/0172* (2013.01); *G02B 27/0075* (2013.01); *G02B 27/026* (2013.01)

(58) Field of Classification Search
None
See application file for complete search history.

(56) References Cited

U.S. PATENT DOCUMENTS

| | | |
|---|---|---|
| 5,371,629 A | 12/1994 | Kurtin et al. |
| 5,424,793 A | 6/1995 | Fukushima et al. |
| 6,832,477 B2 | 12/2004 | Gummin et al. |
| 6,850,221 B1 | 2/2005 | Tickle |

(Continued)

FOREIGN PATENT DOCUMENTS

| | | |
|---|---|---|
| EP | 2649485 | 10/2013 |
| EP | 3914959 | 12/2021 |

(Continued)

OTHER PUBLICATIONS

Azuma, "A Survey of Augmented Reality," Presence: Teleoperators and Virtual Environments, Aug. 1997, 6(4):355-385.

(Continued)

*Primary Examiner* — Stephen T. Reed
(74) *Attorney, Agent, or Firm* — Fish & Richardson P.C.

(57) ABSTRACT

Systems include three optical elements arranged along an optical axis each having a different cylinder axis and a variable cylinder refractive power. Collectively, the three elements form a compound optical element having an overall spherical refractive power (SPH), cylinder refractive power (CYL), and cylinder axis (Axis) that can be varied according to a prescription (Rx).

20 Claims, 6 Drawing Sheets

(56) References Cited

U.S. PATENT DOCUMENTS

| | | |
|---|---|---|
| D514,570 S | 2/2006 | Ohta |
| 7,039,309 B2 | 5/2006 | Hsiao |
| 7,758,185 B2 | 7/2010 | Lewis |
| 8,087,778 B2 | 1/2012 | Gupta et al. |
| 8,353,594 B2 | 1/2013 | Lewis |
| 8,696,113 B2 | 4/2014 | Lewis |
| 8,733,927 B1 | 5/2014 | Lewis |
| 8,733,928 B1 | 5/2014 | Lewis |
| 9,010,929 B2 | 4/2015 | Lewis |
| 9,081,426 B2 | 7/2015 | Armstrong |
| 9,215,293 B2 | 12/2015 | Miller |
| 9,235,064 B2 | 1/2016 | Lewis |
| 9,239,473 B2 | 1/2016 | Lewis |
| 9,244,293 B2 | 1/2016 | Lewis |
| D752,529 S | 3/2016 | Loretan et al. |
| 9,348,143 B2 | 5/2016 | Gao et al. |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,658,473 B2 | 5/2017 | Lewis |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,851,563 B2 | 12/2017 | Gao et al. |
| 9,857,591 B2 | 1/2018 | Welch et al. |
| 10,151,937 B2 | 12/2018 | Lewis |
| 10,185,147 B2 | 1/2019 | Lewis |
| 10,262,462 B2 | 4/2019 | Miller et al. |
| 10,459,231 B2 | 10/2019 | Miller et al. |
| 10,670,808 B1 | 6/2020 | Trail |
| 11,249,309 B2 | 2/2022 | Schaefer et al. |
| 2004/0141735 A1 | 7/2004 | Nomura |
| 2006/0028436 A1 | 2/2006 | Armstrong |
| 2006/0119218 A1 | 6/2006 | Doshida et al. |
| 2007/0018919 A1 | 1/2007 | Zavracky et al. |
| 2007/0081123 A1 | 4/2007 | Lewis |
| 2009/0251798 A1 | 10/2009 | Huang et al. |
| 2012/0127062 A1 | 5/2012 | Bar-Zeev et al. |
| 2012/0162549 A1 | 6/2012 | Gao et al. |
| 2012/0162581 A1 | 6/2012 | Ashida et al. |
| 2013/0050432 A1 | 2/2013 | Perez et al. |
| 2013/0082922 A1 | 4/2013 | Miller |
| 2013/0117377 A1 | 5/2013 | Miller |
| 2013/0125027 A1 | 5/2013 | Abovitz |
| 2013/0141434 A1 | 6/2013 | Sugden et al. |
| 2013/0208234 A1 | 8/2013 | Lewis |
| 2013/0242262 A1 | 9/2013 | Lewis |
| 2014/0071539 A1 | 3/2014 | Gao |
| 2014/0168035 A1 | 6/2014 | Luebke et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0248046 A1 | 9/2015 | Schowengerdt |
| 2015/0268415 A1 | 9/2015 | Schowengerdt et al. |
| 2015/0301356 A1 | 10/2015 | Tabirian et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0004102 A1 | 1/2016 | Nisper et al. |
| 2016/0011419 A1 | 1/2016 | Gao |
| 2016/0026253 A1 | 1/2016 | Bradski et al. |
| 2016/0047956 A1 | 2/2016 | Tabirian et al. |
| 2016/0209560 A1 | 7/2016 | Tabirian et al. |
| 2017/0000326 A1 | 1/2017 | Samec et al. |
| 2017/0010469 A1 | 1/2017 | Samec et al. |
| 2017/0045742 A1 | 2/2017 | Greenhalgh et al. |
| 2017/0168307 A1 | 6/2017 | Itani |
| 2017/0223344 A1 | 8/2017 | Kaehler |
| 2018/0088381 A1 | 3/2018 | Lin et al. |
| 2018/0129048 A1 | 5/2018 | Robbins et al. |
| 2018/0143473 A1 | 5/2018 | Yamazaki et al. |
| 2018/0314066 A1 | 11/2018 | Bell et al. |
| 2018/0356639 A1 | 12/2018 | Schaefer et al. |
| 2019/0171026 A1 | 6/2019 | Parsons |
| 2020/0051320 A1 | 2/2020 | Laffont et al. |
| 2020/0058256 A1 | 2/2020 | Seibert et al. |
| 2020/0069174 A1 | 3/2020 | Marin et al. |
| 2020/0073143 A1 | 3/2020 | Macnamara et al. |
| 2020/0174284 A1 | 6/2020 | Chan et al. |
| 2020/0371360 A1 | 11/2020 | Dalrymple et al. |
| 2021/0041711 A1* | 2/2021 | Sharp .................. G02B 27/0018 |
| 2021/0141212 A1* | 5/2021 | Jacoby ..................... G02C 7/14 |
| 2022/0137418 A1 | 5/2022 | Schaefer et al. |
| 2022/0221710 A1 | 7/2022 | Dalrymple et al. |

FOREIGN PATENT DOCUMENTS

| | | |
|---|---|---|
| JP | S 60-010224 | 1/1985 |
| JP | H02110511 A | 4/1990 |
| JP | 2007240709 A | 9/2007 |
| JP | 2012-505430 | 3/2012 |
| KR | 10-2016-0091402 | 8/2016 |
| WO | WO 2012/078410 | 6/2012 |
| WO | WO 2015/081313 | 6/2015 |
| WO | WO 2016/181108 | 11/2016 |
| WO | WO 2018/231784 | 12/2018 |
| WO | 2022197603 A1 | 9/2022 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

Chen et al., "Electrically adjustable location of a projected image in augmented reality via a liquid-crystal lens," Optics Express, Oct. 2015, 23(22): 9 pages.

Extended European Search Report in European U.S. Appl. No. 20/738,194, dated Feb. 7, 2022, 10 pages.

hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

International Preliminary Report on Patentability in International Appln. No. PCT/US2018/37039, dated Dec. 17, 2019, 8 pages.

International Search Report and Written Opinion in International Appln. No. PCT/US2018/37039, dated Oct. 30, 2018, 16 pages.

International Search Report and Written Opinion in International Appln. No. PCT/US2022/020181, dated Jun. 29, 2022, 13 pages.

Invitation to Pay Additional Fees in International Appln. No. PCT/US2018/37039, dated Aug. 27, 2018, 3 pages.

Jacob, "Eye Tracking in Advanced Interface Design," Virtual environments and advanced interface design, 1995, 258:288, 50 pages.

Office Action in Indian Appln. No. 202047018987, dated Mar. 29, 2022, 5 pages.

Office Action in Japanese Appln. No. 2019-568041, dated Apr. 27, 2022, 12 pages (with English translation).

PCT International Search Report and Written Opinion in International Appln. No. PCT/US2020/034401, dated Aug. 26, 2020, 14 pages.

PCT International Search Report and Written Opinion in International Appln. No. PCT/US2020/034406, dated Sep. 8, 2020, 14 pages.

(56) References Cited

OTHER PUBLICATIONS

Tabiryan et al., "Superlens in the skies: liquid-crystal-polymer technology for telescopes," SPIE, Feb. 2016, 2 pages.
Tanriverdi et al., "Interacting with Eye Movements in Virtual Environments," Proc. of the SIGCHI Conference on Human Factors in Computing Systems, 2000, pp. 265-272.
International Search Report and Written Opinion in PCT/US2021/045110, dated Nov. 3, 2021 (9 pages).
Notice of Allowance in Japanese Appln. No. 2019-568041, dated Apr. 17, 2023, 5 pages (with English translation).

* cited by examiner

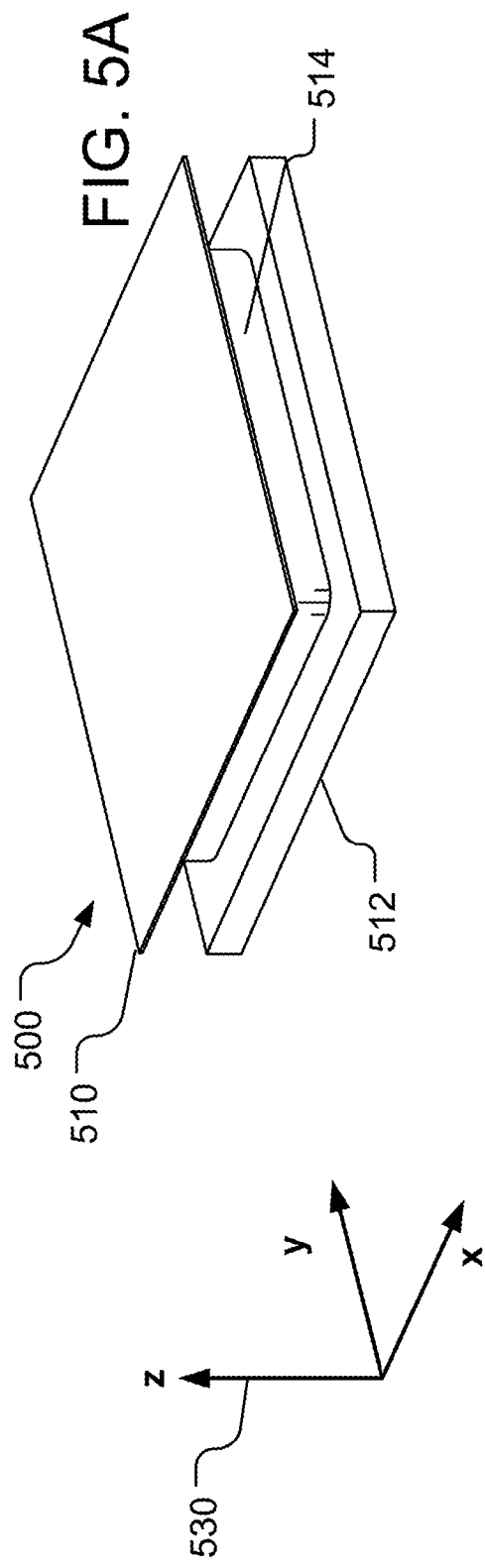
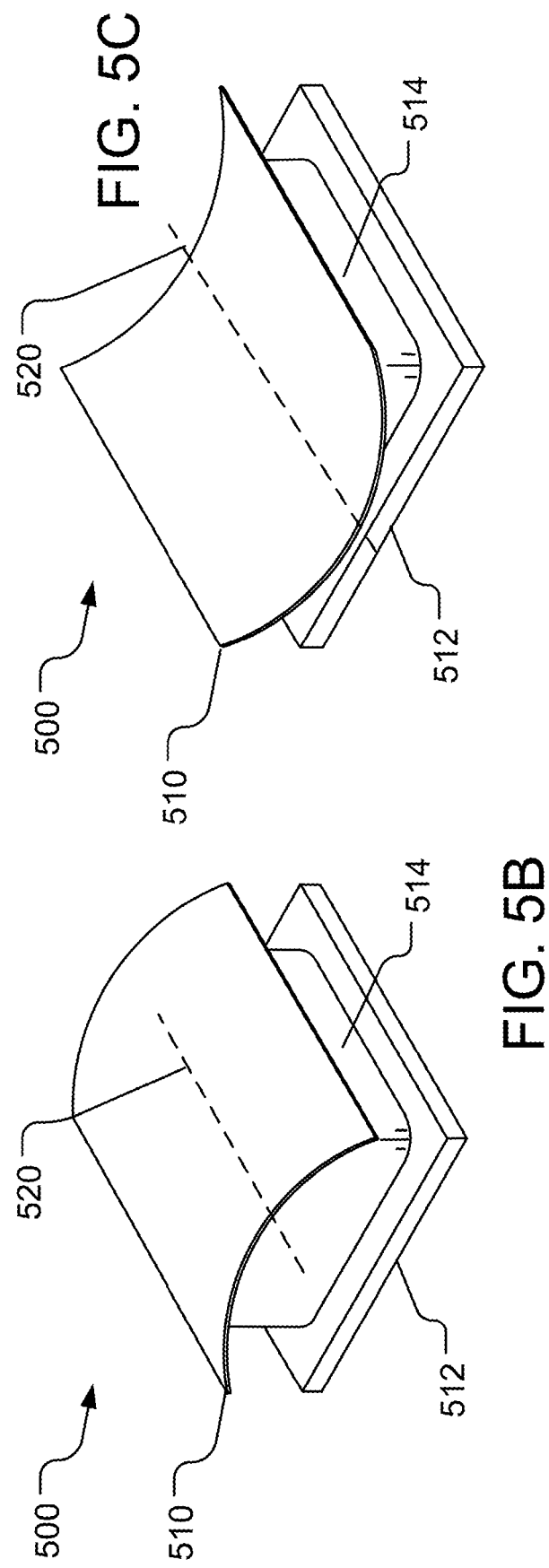

TUNABLE CYLINDRICAL LENSES AND HEAD-MOUNTED DISPLAY INCLUDING THE SAME

CLAIM OF PRIORITY

This application is a National Stage Application of International Application No. PCT/US2021/045110, filed Aug. 6, 2021, which claims priority under 35 USC § 119(e) to U.S. Patent Application Ser. No. 63/062,746, filed on Aug. 7, 2020, the entire contents of which are hereby incorporated by reference.

FIELD OF THE DISCLOSURE

The disclosure relates to tunable lenses and more specifically, to head-mounted displays incorporating tunable lenses to correct for refractive error of a user.

BACKGROUND

Wearable display systems for augmented reality can include one or two eyepieces through which a user can view the world and with which the display system can project digital imagery to the user. Eyepieces are often formed using highly refractive materials and are typically designed to account for users with emmetropic vision, i.e., with no refractive error.

For users with non-emmetropic vision, such as short sighted (myopic) or far sighted (hyperopic) users, custom inserts can be provided in the wearable display that correct for a user's refractive error, e.g., according to their ophthalmic prescription (Rx). Alternatively, the display's form factor can be designed to accommodate eyeglasses between the wearer and the display's eyepiece. However, customization of the headset can be both time-consuming and expensive and form factors that accommodate eyeglasses can be unwieldy and aesthetically unappealing.

SUMMARY

This disclosure features a tunable lenses that can be integrated into an eyepiece of a head mounted display for the correction of non-emmetropic vision, particularly in a virtual reality head mounted display. The eyepiece can include a fully integrated, field-configurable optic arranged with respect to a waveguide used to project digital imagery to the user, the optic being capable of providing a tunable Rx for the user including variable spherical refractive power (SPH), cylinder refractive power (CYL), and cylinder axis (Axis) values. In certain configurations, each tunable eyepiece includes two variable compound lenses: one on the user-side of the waveguide with variable sphere, cylinder, and axis; and a second on the world side of the waveguide with variable sphere. Collectively, the variable compound lenses can correct for refractive error of the user, including astigmatism, and can position digital images at appropriate depth planes relative to the environment and corresponding to the user depth-of-fixation.

In some embodiments, each compound lens is composed of multiple (e.g., two or three) variable cylindrical lenses. For example, each variable cylindrical lens can include a deformable refractive element integrated with an actuator. The actuators apply forces to the deformable refractive elements to vary the curvature of one or two surfaces of the lens, thereby varying the optical power of the cylindrical lens. An assembly of two such variable cylindrical lenses whose cylinder axes are oriented at right angles can be used to provide a compound lens with adjustable spherical power. An assembly of three variable cylindrical lenses whose cylinder axes are oriented at 60° intervals can be used to provide a compound lens with adjustable SPH, CYL, and Axis.

In a first aspect, disclosed herein is a system, including: a first optical element including a first refractive element arranged along an optical axis, and a first actuator arranged to vary a cylinder refractive power of the first refractive element in response to a first control signal, the first refractive element having a first cylinder axis associated with the first refractive element along a first radial direction orthogonal to the optical axis; a second optical element including a second refractive element arranged along the optical axis, and a second actuator arranged to vary a cylinder refractive power of the second refractive element in response to a second control signal, the second refractive element having a second cylinder axis associated with the second refractive element along a second radial direction orthogonal to the optical axis; a third optical element including a third refractive element arranged along the optical axis, and a third actuator arranged to vary a cylinder refractive power of the third refractive element along a third radial direction orthogonal to the optical axis in response to a third control signal, where the first, second, and third radial directions are different; and an electronic controller in communication with the first, second, and third actuators, the electronic controller being configured, during operation, to provide the first, second and third control signals to the first, second, and third actuators, respectively, so that the first, second, and third refractive elements collectively form an optical element having an overall spherical refractive power (SPH), cylinder refractive power (CYL), and cylinder axis (Axis) according to a prescription (Rx).

In some implementations, an angular separation between the first and second radial directions can be equal to an angular separation between the second and third radial directions. For a Cartesian coordinate system orthogonal to the optical axis, the first radial direction can be at 30°, the second radial direction can be at 90°, and the third radial direction can be at 150°. The first cylinder refractive power, $C_{30}$, the second cylinder refractive power, $C_{90}$, and the third cylinder refractive power, $C_{150}$, and values for S, C, and A are related according to the formulae:

$$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C$$

At least one of the refractive elements can include a deformable optical material. The deformable optical material can be a solid optical material. The solid optical material can be an elastomeric material. The elastomeric material can be a silicone elastomer. The at least one of the refractive elements can include a deformable transparent membrane adjacent the deformable optical material, the actuator of the at least one refractive element being arranged to deform a shape of the deformable transparent membrane to vary the cylinder refractive power of the at least one refractive element. The actuator bows the membrane about the cylinder axis of the at least one refractive element to vary the cylinder refractive power of the at least one refractive element. The at least one of the refractive elements can include a rigid transparent substrate adjacent the deformable optical material on an opposing side of the refractive element from the deformable optical material. The optical element of the at least one of the refractive elements can include a rigid gasket at an edge of the deformable optical material and the deformable transparent membrane pivots on the rigid gasket when acted upon by the actuator. The cylinder refractive power of each of the first, second, and third optical elements can be variable through a range from −5 D to +5 D. The optical element has an aperture having an area of 1 cm$^2$ or more. (E.g., 5 cm$^2$ or more, 10 cm$^2$ or more, 16 cm$^2$ or more). Each of the refractive elements has a thickness along the optical axis of 10 mm or less. (E.g., 6 mm or less, 4 mm or less, 3 mm or less, 2 mm or less, 1 mm or less).

Each optical element can include a pair of refractive elements, each refractive element of the pairs having a cubic profile oriented along an axis in the radial direction of the optical element, the actuator of the corresponding optical element being arranged to slide the pair of refractive elements in opposite directions orthogonal to the optical axis.

In a second aspect, disclosed herein is a head-mounted display system, including: a first optical element having a variable spherical refractive power (SPH); a second optical element having a variable SPH, a variable cylinder refractive power (CYL), and a variable cylinder axis (Axis); a see-through display arranged between the first optical element and the second optical element; and an electronic controller in communication with the first optical element, the second optical element, and the see-through display, the electronic controller being programmed to adjust the SPH of the first optical element and the SPH, CYL, and Axis of the second optical element according to a prescription (Rx) of an individual user of the head-mounted display.

The head-mounted display can further include a frame for mounting the first optical element, second optical element, and see-through display relative to each other and, during use, relative to a user of the head-mounted display. The second optical element can be arranged between the see-through display and the user during use of the head-mounted display. The first optical element can include two variable cylindrical lenses having their respective cylinder axes orthogonal to each other. The head-mounted display can further include an eye-tracking module, the electronic controller being programmed to vary the prescription of the second optical element based on information about where a user of the head-mounted display can be looking from the eye-tracking module. The electronic controller can be programmed to vary the SPH, CYL, and Axis of the second optical element from a near-vision prescription to a distance-vision prescription depending on where the user can be looking. The head-mounted display can further include a biometric identification module, the electronic controller being programmed to identify a user based on information from the biometric identification module and adjust a prescription of the second optical element based on the user's identity. The biometric identification module can be an iris identification module.

Among other advantages, the tunable eyepiece can correct for the unique optical prescription, including astigmatism, of a user while minimizing electrical power consumption and electro-mechanical overhead. The tunable eyepiece can alleviate the need to fabricate a custom rigid eyepiece for each user and increase the availability of mixed reality products users with non-emmetropic vision. An included biometric module can identify a user based on their unique iris pattern and adjust the tunable eyepieces to adjust to the prescription of multiple users in the field.

Other advantages will be apparent from the description, the drawings, and the claims.

BRIEF DESCRIPTION OF THE DRAWINGS

FIG. 5A is a perspective view of three components of a refractive element in a plano configuration.

FIG. 5B is a perspective view of the refractive element components shown in FIG. 5A actuated to provide positive cylindrical power.

FIG. 5C is a perspective view of the refractive element components shown in FIG. 5A actuated to provide negative cylindrical power.

In the figures, like symbols indicate like elements.

DETAILED DESCRIPTION

Figure 1:
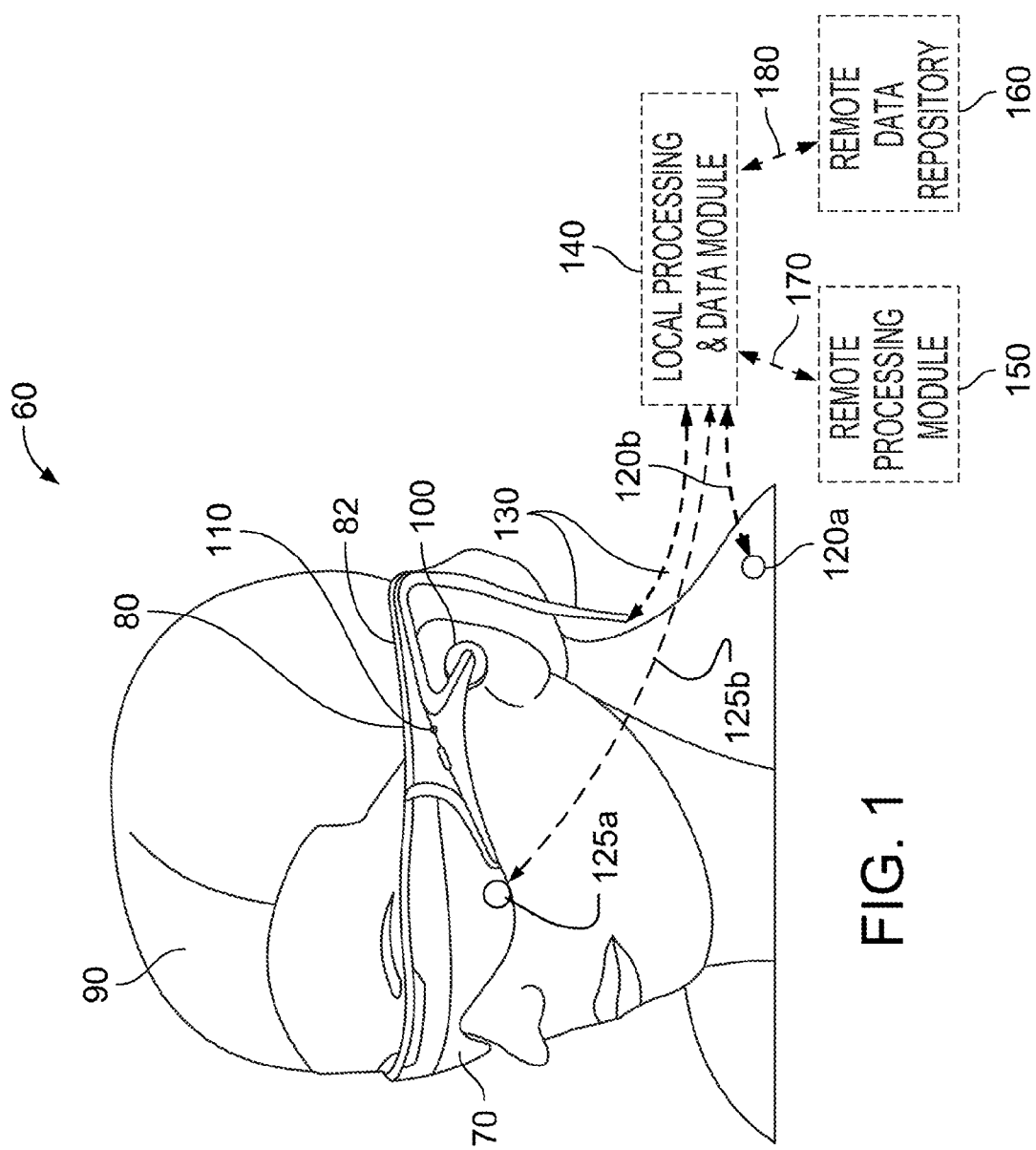
FIG. 1 is a schematic diagram of a wearable headset display.

FIG. 1 illustrates an example head-mounted display system 60 that includes a see-through display 70, and various mechanical and electronic modules and systems to support the functioning of that display 70. The display 70 is housed in a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

In some embodiments, the display system may also include an eye-tracking module 125a. In some embodiments, the eye-tracking module 125a can include a biometric identification module to acquire biometric data of the user 90. In some embodiments, the biometric identification module can be an iris identification module.

In some embodiments, the eye-tracking module 120a may acquire depth-of-fixation data. The eye-tracking module 120a may be operatively coupled by communications link 125b (e.g., a wired lead or wireless connectivity) to the local processor and data module 140. The eye-tracking module 120a may communicate the biometric and depth-of-fixation data to the local processor and data module 140.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Variable eyepiece components included with the eyepiece of a display adjust the refractive power of the eyepiece in order to match the depth of the fixation for a user with the user's vision. The refractive power of the variable components can be set at different values across a range of possible values, performing the function of fixed lenses with the added flexibility of controllable correction. The optical prescription (Rx) of a user for correcting refractive error can be loaded into the headset controller and the variable components modified to correct for the unique set of parameters within. The headset can perform this modification for each new user, correcting for each unique Rx in turn.

Figure 2:
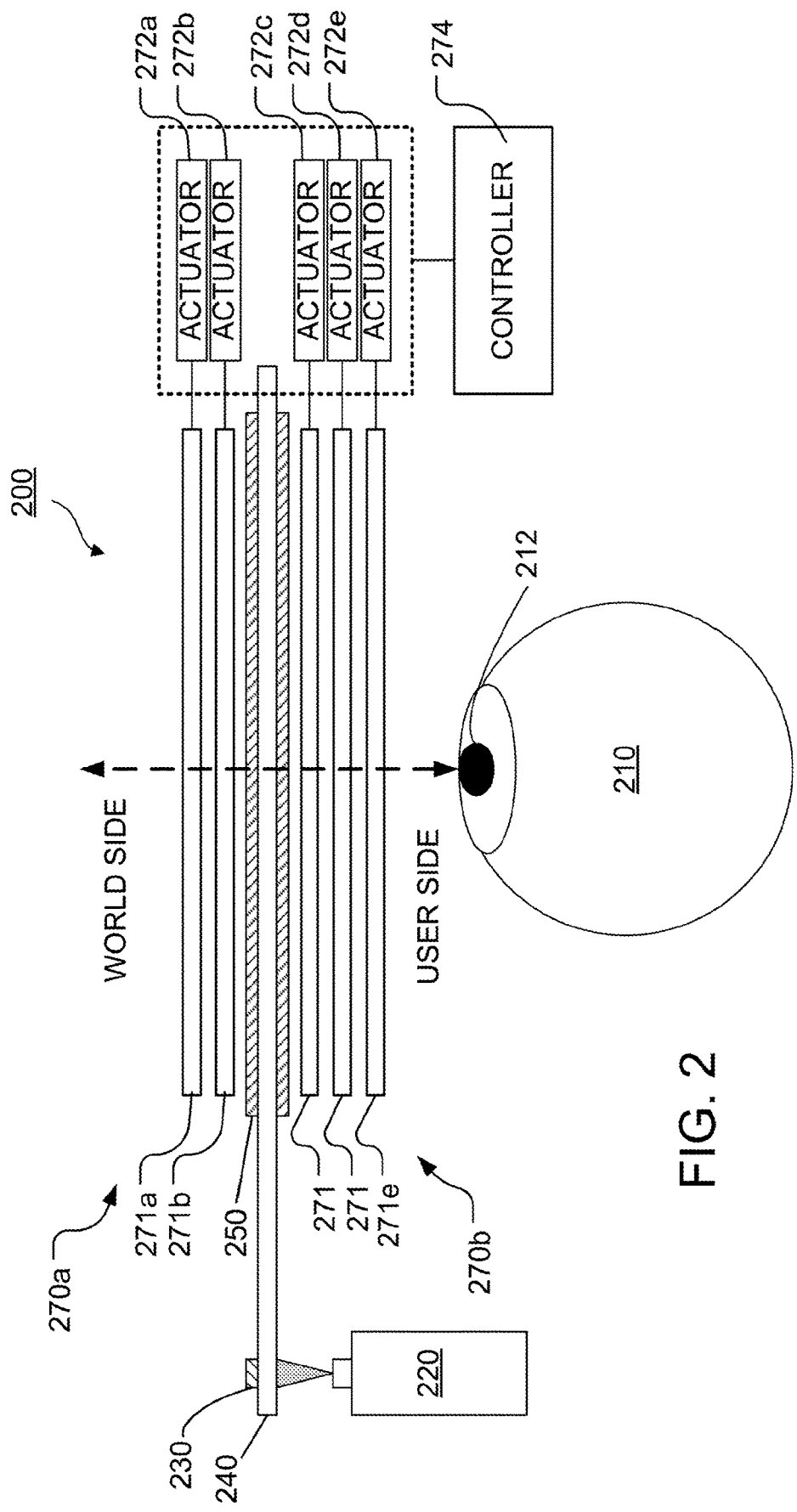
FIG. 2 is a schematic diagram representing the placement of an eye behind a tunable eyepiece with proximal and distal tunable optical elements.

Referring to FIG. 2, an eyepiece 200 of a head-mounted display system directs light from a projector 220 to the eye 210 of a user. The projector 220 and eyepiece 200 are positioned relative to one another and to the eye 210 of the user by a frame or housing (not shown). The projector 220 is located beside the user's temple and directs light to an end of the eyepiece 200 that extends past the user's temple. As shown, eyepiece 200 includes a planar waveguide 240, an input coupling grating (ICG) 230, and out-coupling element (OCE) 250, however, more complex arrangements (e.g., composed of multiple stacked waveguides) are possible. A first variable focus assembly 270a is located on the world side of waveguide 240 and a second variable focus assembly 270b is located on the user side. Collectively, the refractive powers of variable focus assemblies 270a and 270b are adjusted to concurrently correct the optical properties of the eyepiece to account for the virtual image depth plane and the Rx of a user.

ICG 230 is a surface grating positioned to receive light from projector 220 and facilitates in-coupling of light from projector 220 into the eyepiece 200. The ICG 230 is located at or close to the edge of the eyepiece 200 closest to the projector 220. The ICG 230 directs the light from the projector 220 into guided modes in the planar waveguide substrate 240 of eyepiece 200.

The planar waveguide substrate 240 guide the in-coupled light along the eyepiece 200 through total internal reflection at its surfaces to the out-coupling element (OCE) 250. The OCE 250 is a second surface grating configured to extract the light out of the planar waveguide substrate 240 and redirect it towards the eye 210 of the user. The OCE 250 can include an exit pupil expander (EPE) or an orthogonal pupil expander (OPE) or both. The OCE 250 is located in front of the user's eye 210, delivering light from the projector to the region in which a pupil 212 of the user can be positioned to receive light outputted from the OCE 150. This region is termed the eyebox. The OCE 250 can further have a lateral dimension to accommodate a range of lateral positions of the eyebox. For example, a non-limiting range of the lateral dimension 251 of the OCE 250 can be 30 mm or less (e.g., 25 mm or less, 20 mm or less, 15 mm or less).

Variable focus assembly 270b arranged on the user-facing surface of the eyepiece 200 corrects for the non-emmetropic vision of the user, including for astigmatism. Variable focus assembly 270b additionally places the focus of the eyepiece 200 at the correct depth plane to display virtual images. This placement of the focus also affects the focus of real images passing through the display to the user. The variable focus assembly 270a arranged on the world-facing surface of the eyepiece 200 corrects the real image focus placement resulting from the correction of variable focus assembly 270b. Variable focus assembly 270a includes two optical elements, 271a and 271b, and variable focus assembly 270b includes three optical elements, 271c, 271d, and 271e.

In some embodiments, each optical element 271a-e includes a refractive element incorporating a deformable optical material in contact with a deformable membrane. The refractive elements are coupled to actuators 272a-e, which operate to change the refractive power of the connected optical element 271a-e, described further in FIG. 4. The actuators 272, for example, can deform at least one surface of the corresponding refractive element along a single axis, thereby causing the refractive element of the optical element 271 to perform the function of a variable cylindrical lens. In some embodiments, the actuators can be piezoelectric actuators.

Actuators 272a-e apply forces responsive to control signals from the controller 274. In certain implementations, the headset controller 274 performs the calculations to determine the refractive power for each optical element 271a-e. The lens profile of each optical element 271a-e combine to establish the refractive power of the variable focus assembly 270a or 270b. The optical power for the variable focus assemblies can vary based on a variety of considerations, including user Rx, user environment, projected imagery, and/or a combination of these parameters.

In some embodiments, the controller 274 can receive biometric data from an eye-tracking module and adjust the refractive power of variable focus assembly 270b to correct for the Rx of the user based on their biometric identification. In some embodiments, the controller 274 can receive user depth-of-fixation data from the eye-tracking module and adjust the refractive power of variable focus assembly 270b to correct for the near- or distance-vision Rx of a user. Similarly, the controller 274 can receive user depth-of-fixation data from the eye-tracking module and adjust the lens profile of variable optical element 270a to adjust the optical depth of virtual images to match the depth of the fixation for a user.

In general, a person's eye can have refractive errors that lead to conditions such as myopia, hyperopia, astigmatism, or a combination thereof. Using corrective lenses to modify the incoming light rays corrects for these refractive errors. Myopic or hyperopic refractive errors occur when the projected image of an eye is out of focus with the back plane of the eye and are typically corrected through lenses with a 'spherical' profile placed between the eye and incoming light. Broadly, a plano-spherical lens profile can be considered a planar section of the surface of a sphere resulting in a lens profile with two opposing surfaces, a curved surface and a planar surface. The curved surface of a spherical lens is radially symmetric around a central axis oriented orthogonally to the planar surface. A lens with a spherical profile arranged along the optical axis of a user's eye corrects for these refractive errors.

Astigmatism refractive errors are due the eye lens having differential curvatures along different directions. A lens having a 'cylinder' profile can correct this type of error. A plano-cylindrical lens profile can be considered a planar section of a cylinder taken parallel to the longitudinal axis of the cylinder. This results in a lens with opposing curved and planar surfaces (e.g., convex). The longitudinal axis along the center of the planar surface is termed the cylinder axis. The curved surface has an equal radius of curvature along the length of the cylinder profile.

Typically, a lens having a spherical component and a cylinder component are used to correct refractive errors of an astigmatic non-emmetropic eye. An ophthalmic prescription (Rx) combines a spherical component, a cylindrical component, and a cylinder axis component (SPH, CYL, Axis) which are respectively the refractive powers of a spherical and a cylindrical lens, and the orientation of the cylinder axis. A Cartesian coordinate system oriented orthogonally to the optical axis with 0° directed horizontally can be used to define the cylinder axis.

A spherical or cylindrical lens have respective strengths, or refractive powers, typically measured in diopters (D). The refractive power of a lens can be zero, a negative (e.g., divergence), or a positive (e.g., convergence) number. Without wishing to be bound by theory, the refractive power can be equal to the reciprocal of the focal length (f), D=1/f. For example, a lens with a refractive power of +3 D brings parallel rays of light from optical infinity to focus at ⅓ meter. For a further example, a flat or plano lens has a refractive power of 0 D and does not cause light to converge or diverge.

Figure 3A:
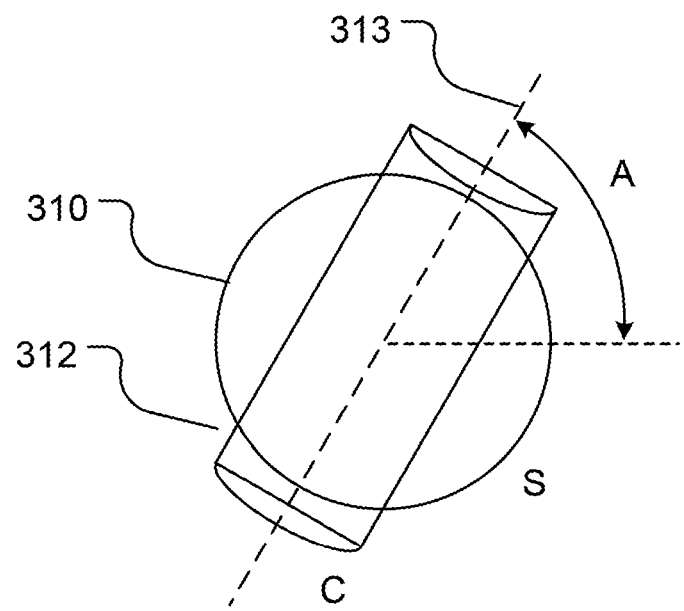
FIG. 3A is a diagram of compound lens used to correct for non-emmetropic vision including a spherical and a cylindrical lens.

An Rx can be represented by a combination of a spherical lens and a cylindrical lens, as shown in FIG. 3A. Depicted is an exemplary assembly of a spherical lens 310 of refractive power S, and a cylindrical lens 312 of refractive power C. The cylinder axis 313 of the cylindrical lens 312 is shown oriented at an angle A with respect to a horizontal plane. Without wishing to be bound by theory, the phase profile at a point (x,y) on the surface of any $R_x$ is proportional to $R_x(x, y) \propto S(x^2+y^2) + C(\cos Ax + \sin Ay)^2$ where S the refractive power of the spherical lens, C is the refractive power of the cylindrical lens, and A is the angular orientation of the cylindrical lens.

Figure 3B:
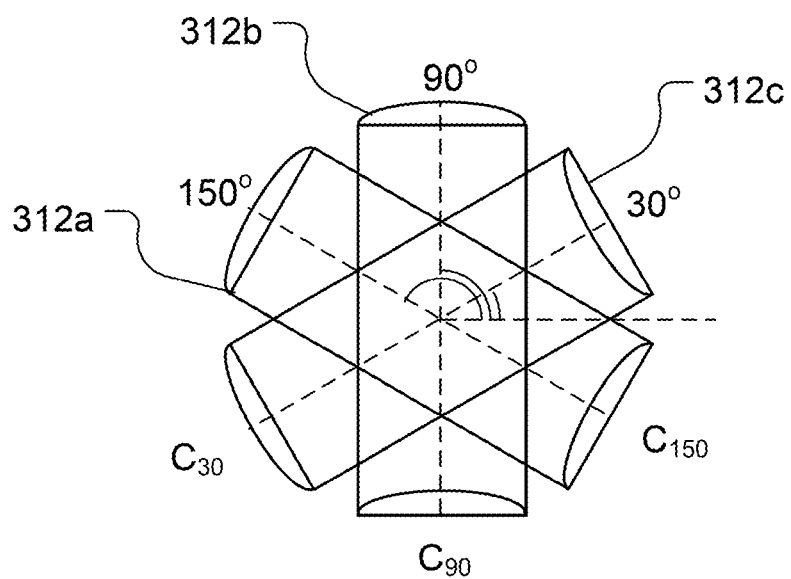
FIG. 3B is a diagram of three cylindrical lenses representing an alternative means to correct for non-emmetropic vision.

The correction power of a spherical lens 310 can be alternatively achieved by a pair of cylinder lenses 312 whose cylinder axes are oriented at 90° from each other. Accordingly, the combination of spherical 310 and cylindrical lens 312 shown in FIG. 3A is similarly achievable through the combination of three cylindrical lenses. FIG. 3B depicts the arrangement of three cylindrical lenses 312a, 312b, and 312c with their cylinder axes arranged at radial directions of 30°, 90°, and 150° from the horizontal plane of the eye, with respective refractive powers of $C_{30}$, $C_{90}$, and $C_{150}$. Without wishing to be bound by theory, the refractive powers $C_{30}$, $C_{90}$, and $C_{150}$ necessary to correct for an $R_x$ with spherical and cylindrical components can be determined using $$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C$$

for each respective lens.

Based on the above, the optical elements 271a-e described in FIG. 2 can perform the function of cylindrical lenses and they can be oriented and combined in optical elements to accomplish the desired Rx.

While the arrangement of cylinder axes arranged at radial directions of 30°, 90°, and 150° have been described and will function for any three element Rx (e.g., SPH, CYL, Axis), these orientations are not the only solution capable of providing correction for astigmatic non-emmetropic vision. In general, there are many sets of angles that would give sufficient degrees of freedom to match the three parameters of an Rx. For example, three cylinder axes oriented at 0°, 60°, and 120° (e.g., from the horizontal plane of the eye) may also correct for such an Rx. This arrangement maintains the 60° separation between cylinder axes described in FIG. 3B. Though as a further example, three cylinder lenses with cylinder axes separated by 45° (e.g., 0°, 45°, 90°) may also provide the correction necessary for a three element $R_x$.

In general, the total angular separation between the three cylinder axes of a set of cylindrical lenses can be sufficient to preclude redundancy between two or more of the cylinder lenses. For example, the total angular separation between the three cylinder axes can be in a range from 45° to 180°. The angular displacement of a middle of the three cylinder axes can be approximately equal from the other two cylinder axes (e.g., for a total angular separation of 90°, the middle axes can be 45° from the other two) or the cylinder axes can be separated by unequal angles.

Figure 4A:
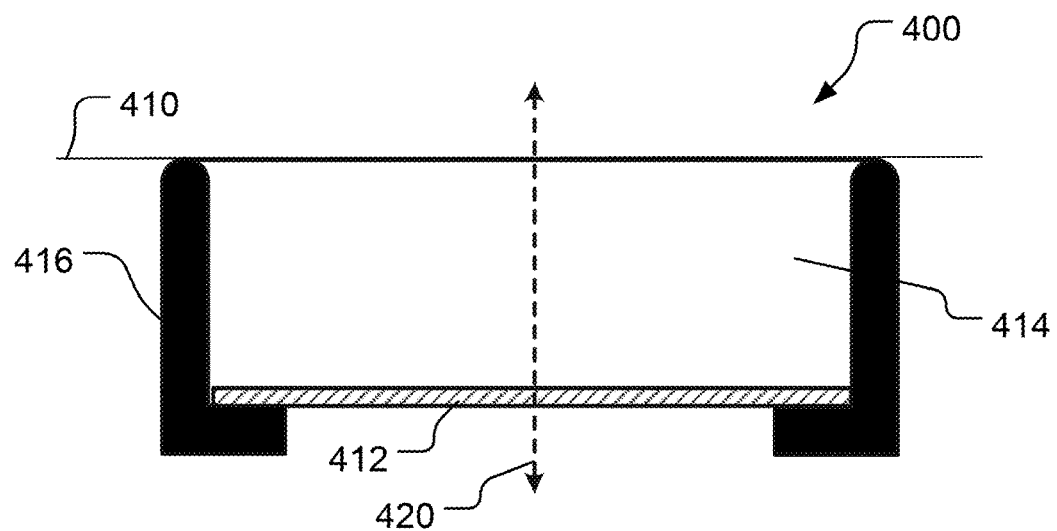
FIG. 4A is a schematic diagram depicting an edge-view of an unactuated exemplary refractive element.
Figure 4B:
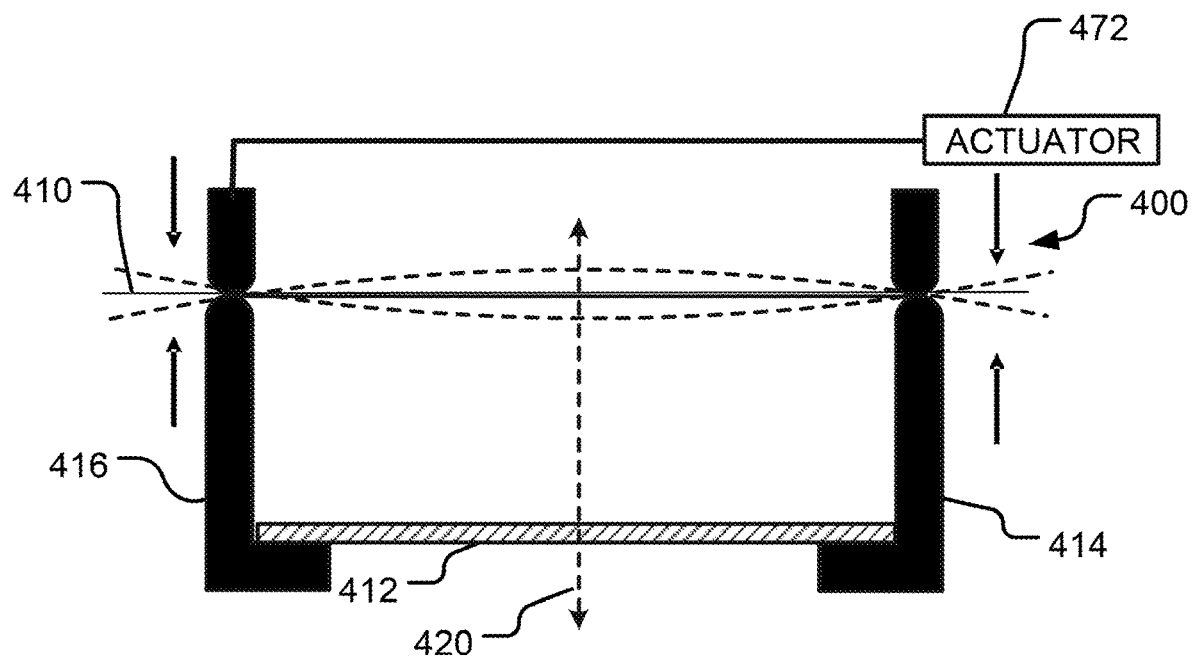
FIG. 4B is a schematic diagram depicting an edge-view of an exemplary refractive element combined with an actuator in register with the gasket.

In general, a variety of optical elements capable of providing a variable cylindrical lens can be used for the variable focus assemblies depicted in FIG. 2. An example is shown in FIGS. 4A and 4B, which shows an optical element 400 composed of a deformable transparent membrane 410, a transparent substrate 412, a deformable optical material 414, and a gasket 416 around the edge of the deformable optical material 414. Together, deformable transparent membrane 410, deformable optical material 414, and substrate 412 form a variable cylindrical lens with an optical axis 420 orthogonal to the cylinder axis, which extends perpendicular to the plane of the figure. The thickness of optical element 400 is 10 mm or less (e.g., 6 mm or less, 4 mm or less, 3 mm or less, 2 mm or less, 1 mm or less). Relatively thin optical elements can be desirable, providing a compact, light device suitable for incorporating into a head-mounted display.

Optical element 400 also includes an actuator 472 arranged to change the cylinder refractive power of the optical element.

The deformable transparent membrane 410 is positioned in contact with the upper rim of the rigid gasket 416 and the upper surface of the optical material 414. Contact elements of actuator 472 are positioned in contact with the opposite side of membrane 410. The transparent membrane 410 is composed of a transparent material capable of deforming (e.g., bowing) when appropriate force is applied. Example materials include inorganic glasses, such as borosilicate glass, or plastic films, such as thin film polycarbonate. The thickness of the transparent membrane 410 is sufficient to provide protection to the optical material 416 while still remaining flexible. For example, the transparent membrane can be about 0.1 mm or less thick.

The gasket 416 encircles the edge and enclosing the optical material 414 to a common height. The gasket 416 contains the lateral expansion and contraction of the material 414 when the optical element 271 is actuated. The gasket 416 further partially encases the transparent substrate 412 to form an aperture through which light passes along the optical axis 420. In some embodiments, the aperture can be have a viewing area of 1 cm$^2$ or more (e.g., 5 cm$^2$ or more, 10 cm$^2$ or more, 16 cm$^2$ or more).

Arranged between the substrate 412 and the membrane 410 is the deformable optical material 414. The optical material 414 is composed of a low durometer material that is substantially transparent to light at optical wavelengths. In some embodiments, the optical material can be a solid optical material, such as an elastomeric material. For example, materials such as silicone elastomers or gels can be used for the optical material 414. Other materials measuring between 10 and 50 on a 000-scale Shore durometer can also be considered (e.g., between 10 and 40, between 10 and 30, between 10 and 20, between 20 and 50, between 30 and 50, or between 40 and 50).

The rigid transparent substrate 412 provides a rigid base for the deformable optical material 414 and extends across the full interior width of the rigid gasket 416. The rigid transparent substrate 412 is composed of a material that retains its shape under the forces applied by the deformable optical material 414 and is substantially transparent to light at optical wavelengths. For example, the substrate 412 can be formed from plastic or inorganic glass. Substrate 412 can have a thickness of 1 mm thick or less (e.g., 0.8 mm or less, 0.6 mm or less, 0.4 mm or less, 0.2 mm or less).

In FIG. 4A, the optical element 400 is shown in an unactuated state in which the deformable membrane 410 has an infinite radius of curvature, e.g., a refractive power of 0. Upon activation by actuator 472, deformations of the membrane 410 compress or expand the optical material 414 thereby changing the refractive power of the optical element.

Referring now to FIG. 4B, actuator 272 mechanism is shown arranged in register with the rigid gasket 416 and in contact with the outer edge of the membrane 410 of the refractive element 400. The actuator 272 pivots on the gasket 416 to apply parallel and co-directional forces thereby deforming the membrane 410 along an axis parallel with and central to the edges of the gasket 416. The deformation changes the radius of curvature of the membrane 410 causing it to bow. The actuator 272 causes the membrane 410 to be concave or convex, correlating to a positive or negative refractive power, respectively. The axis around which the deformations occur is the cylinder axis of the optical element. In the example of FIG. 4B, the axis extends perpendicular out of the plane of the page.

An illustration of these deformations is shown in FIGS. 5A-C. FIG. 5A depicts a refractive element 500 similar to that depicted in FIGS. 4A and 4B, showing only the transparent membrane 510, the rigid substrate 512, and the optical material 514. A Cartesian coordinate system 530 is shown to the left of FIG. 5A for context. The optical axis for refractive element 500 is parallel to the z-axis of coordinate system 530. A change in the radius of curvature of the membrane 510 with respect to a cylinder axis 520 orthogonal to the optical axis causes compression or expansion of the optical material 514 resulting in a change in the refractive power of the refractive element 500. The change in the radius of curvature the membrane 510 causes a positive or a negative cylinder refractive power. For example, the cylinder refractive power can be variable through a range from −5 D to +5 D (e.g., −4 D, −3 D, −2 D, −1 D, 0 D, 1 D, 2 D, 3 D, or 4 D). The cylinder refractive power can be varied in incremental steps of 0.1 D or more (e.g., 0.2 D or more, such as 0.25D or 0.5D) from −5D to +5D, for example.

While FIG. 5A depicts the refractive element 500 in an unactuated state, FIGS. 5B and 5C depict refractive element 500 in actuated states. FIG. 5B shows the refractive element 500 actuated along cylinder axis 520 creating a convex plano-cylinder lens. The lens of FIG. 5B provides a positive cylinder refractive power (e.g., 1 D, 2 D, 3 D, or 4 D). FIG. 5C shows the same exemplary refractive element 500 actuated to form a concave plano-cylinder lens providing a negative cylinder refractive power (e.g., −4 D, −3 D, −2 D, or −1 D).

Figure 6:
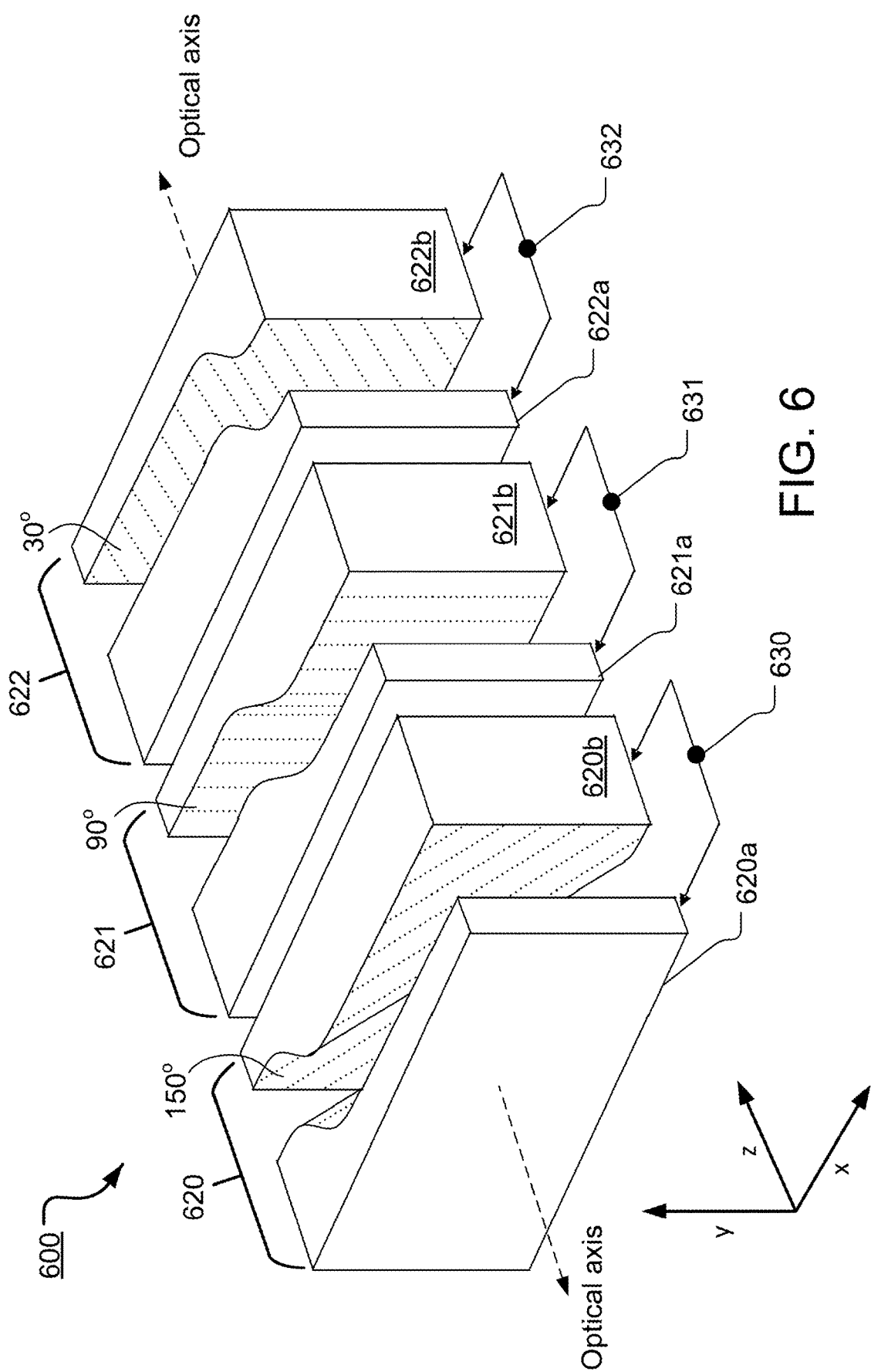
FIG. 6 is a schematic diagram of six paired refractive elements with mirrored cubic profiles in a sliding configuration.

Other assemblies that operate as variable cylindrical lenses are also possible. For example, in another embodiment, a variable focus assembly is composed of sliding pairs of rigid refractive elements (e.g., molded or ground elements formed from glass or plastic), in which each pair operates as a variable cylindrical lens. An example is shown in FIG. 6, which depicts a variable focus assembly 600 that includes three pairs 620, 621, and 622, of refractive elements. Specifically, pair 620 is composed of refractive elements 620*a* and 620*b*, pair 621 is composed of refractive elements 621*a* and 621b, and pair 622 is composed of refractive elements 622a and 622b. An inset perspective axes is shown orienting the x-, y-, and z-axis of FIG. 6.

Each refractive element (620a, b; 621a, b; and 622a, b) has a planar surface and an opposing two-dimensional cubic surface. In general, a cubic surface is a surface defined by a polynomial equation of the third degree, e.g., a cubic polynomial. A refractive element having a cubic surface can be constructed by combination of positive and negative cylindrical lenses profiles of similar radii of curvature. The resulting surface closely follows a cubic polynomial. The cubic surface of one refractive element of a pair faces the second refractive element of the pair whose cubic surface is the mirror of the first. Pairs of refractive elements with aligned cubic vertices perform the function of a lens of zero refractive power. When the cubic vertices of the lenses are translationally misaligned, a refractive element will refract light passing through onto a focal line, thereby performing the effect of a variable cylindrical lens.

Each pair of refractive elements, for example refractive elements 620a and 620b, are separated by a distance that allows the refractive elements to translate with respect to one another without the cubic surfaces coming in contact. In the example embodiment of FIG. 6, refractive elements 620a and 620b are capable of translating along the x-axis by a distance without the cubic surfaces coming in contact. This distance is dependent on the depth of cubic profile of the paired refractive elements. Refractive elements 620a and 620b, 621a and 621b, and 622a and 622b are generally composed of a rigid transparent material such as an inorganic glass (e.g., a borosilicate glass) or a suitable plastic (e.g., polycarbonate).

Using optical element 620 as a representative example, the total thickness of optical element 620 can be 10 mm or less, as described above, and includes the respective thicknesses of refractive elements 620s and 620 and their separation distance. The cubic profiles of refractive elements 620a and 620b are oriented along a common radial axes orthogonal to the optical axis, equivalent to the cylinder axes described above. In this manner, optical element 620 can perform the function of a variable cylindrical lens. Optical element 620 is shown in contact with linear actuator 630. Actuators 630 operates to translate refractive elements 620a and 620b in opposite directions along a common axis orthogonal to the optical axis.

For example, linear actuator 630 can translate refractive elements 620b with respect to 620a to create a positive or a negative refractive power. Misaligning the mirrored cubic profiles of a refractive element in one direction will result in positive refractive power (e.g., 1 D, 2 D, 3 D, 4 D, or 5 D). Misaligning the mirrored cubic profiles of a refractive element in the opposite direction will result in a negative cylinder refractive power (e.g., −1 D, −2 D, −3 D, −4 D, or −5 D).

The three optical elements 620, 621, and 622 are shown with cylinder axes corresponding to 150°, 90°, and 30° from the horizontal plane of the eye, similar to the lenses of FIG. 3B. Said differently, the cylinder axes are oriented on the x-y plane at 150°, 90°, and 30° from the x-axis, respectively. The dashed lines on the cubic surfaces of refractive elements 620b, 621b, and 622b are aligned with the respective cylinder axes of optical elements 620, 621, and 622. Each optical element 620, 621, and 622, is shown in contact with linear actuators 630, 631, and 632. As described above, any three refractive elements with their respective cubic profiles corresponding to 150°, 90°, and 30° from the horizontal plane of the eye, such as the exemplary system of FIG. 6, performs the correction for the ophthalmic prescription of any user. Similarly, any two such optical elements with cubic vertices oriented at a right angle will perform the function of a spherical lens. For example, such an arrangement can be used to perform the virtual image plane adjustment for variable focus assembly 270a.

A number of embodiments are described. Other embodiments are in the following claims.

What is claimed is:

1. A system, comprising:
    a first optical element comprising a first refractive element arranged along an optical axis, and a first actuator arranged to vary a cylinder refractive power of the first refractive element in response to a first control signal, the first refractive element having a first cylinder axis associated with the first refractive element along a first radial direction orthogonal to the optical axis;
    a second optical element comprising a second refractive element arranged along the optical axis, and a second actuator arranged to vary a cylinder refractive power of the second refractive element in response to a second control signal, the second refractive element having a second cylinder axis associated with the second refractive element along a second radial direction orthogonal to the optical axis;
    a third optical element comprising a third refractive element arranged along the optical axis, and a third actuator arranged to vary a cylinder refractive power of the third refractive element along a third radial direction orthogonal to the optical axis in response to a third control signal, where the first, second, and third radial directions are different; and
    an electronic controller in communication with the first, second, and third actuators, the electronic controller being configured, during operation, to provide the first, second and third control signals to the first, second, and third actuators, respectively, so that the first, second, and third refractive elements collectively form an optical element having an overall spherical refractive power (SPH), cylinder refractive power (CYL), and cylinder axis (Axis) according to a prescription (Rx).

2. The system of claim 1, wherein an angular separation between the first and second radial directions is equal to an angular separation between the second and third radial directions.

3. The system of claim 1, wherein, for a Cartesian coordinate system orthogonal to the optical axis, the first radial direction is at 30°, the second radial direction is at 90°, and the third radial direction is at 150°.

4. The system of claim 3, wherein the first cylinder refractive power, $CC_{30}$ the second cylinder refractive power, $C_{90}$, and the third cylinder refractive power, $C_{150}$, and values for S, C, and A are related according to the formulae:

$$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C$$

5. The system of claim 1, wherein at least one of the refractive elements comprises a deformable optical material comprising a solid optical material.

6. The system of claim 5, wherein the solid optical material is an elastomeric material comprising a silicone elastomer.

7. The system of claim 5, wherein the at least one of the refractive elements comprises a deformable transparent membrane adjacent the deformable optical material, the actuator of the at least one refractive element being arranged to deform a shape of the deformable transparent membrane to vary the cylinder refractive power of the at least one refractive element.

8. The system of claim 7, wherein the actuator bows the membrane about the cylinder axis of the at least one refractive element to vary the cylinder refractive power of the at least one refractive element.

9. The system of claim 7, wherein the at least one of the refractive elements comprises a rigid transparent substrate adjacent the deformable optical material on an opposing side of the refractive element from the deformable optical material.

10. The system of claim 7, wherein the optical element of the at least one of the refractive elements comprises a rigid gasket at an edge of the deformable optical material and the deformable transparent membrane pivots on the rigid gasket when acted upon by the actuator.

11. The system of claim 1, wherein the cylinder refractive power of each of the first, second, and third optical elements is variable through a range from −5 D to +5 D.

12. The system of claim 1, wherein the optical element has an aperture having an area of 1 cm$^2$ or more and wherein each of the refractive elements has a thickness along the optical axis of 10 mm or less.

13. The system of claim 1, wherein each optical element comprises a pair of refractive elements, each refractive element of the pairs having a cubic profile oriented along an axis in the radial direction of the optical element, the actuator of the corresponding optical element being arranged to slide the pair of refractive elements in opposite directions orthogonal to the optical axis.

14. A head-mounted display system, comprising:
a first optical element having a variable spherical refractive power (SPH);
a second optical element having a variable SPH, a variable cylinder refractive power (CYL), and a variable cylinder axis (Axis);
a see-through display arranged between the first optical element and the second optical element; and
an electronic controller in communication with the first optical element, the second optical element, and the see-through display, the electronic controller being programmed to adjust the SPH of the first optical element and the SPH, CYL, and Axis of the second optical element according to a prescription (Rx) of an individual user of the head-mounted display.

15. The head-mounted display of claim 14, further comprising a frame for mounting the first optical element, second optical element, and see-through display relative to each other and, during use, relative to a user of the head-mounted display.

16. The head-mounted display of claim 14, wherein the second optical element is arranged between the see-through display and the user during use of the head-mounted display, and wherein the first optical element comprises two variable cylindrical lenses having their respective cylinder axes orthogonal to each other.

17. The head-mounted display of claim 14, further comprising an eye-tracking module, the electronic controller being programmed to vary the prescription of the second optical element based on information about where a user of the head-mounted display is looking from the eye-tracking module.

18. The head-mounted display of claim 17, wherein the electronic controller is programmed to vary the SPH, CYL, and Axis of the second optical element from a near-vision prescription to a distance-vision prescription depending on where the user is looking.

19. The head-mounted display of claim 14, further comprising a biometric identification module, the electronic controller being programmed to identify a user based on information from the biometric identification module and adjust a prescription of the second optical element based on the user's identity.

20. The head-mounted display of claim 19, wherein the biometric identification module is an iris identification module.

* * * * *